US012736327B2

(12) United States Patent
Tsuchiya et al.

(10) Patent No.: US 12,736,327 B2
(45) Date of Patent: Sep. 15, 2026

(54) FILM THICKNESS MEASUREMENT DEVICE AND FILM THICKNESS MEASUREMENT METHOD

(71) Applicant: HAMAMATSU PHOTONICS K.K., Hamamatsu (JP)

(72) Inventors: Kunihiko Tsuchiya, Hamamatsu (JP); Satoshi Arano, Hamamatsu (JP); Kenichi Ohtsuka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 138 days.

(21) Appl. No.: 18/561,390

(22) PCT Filed: Jan. 25, 2022

(86) PCT No.: PCT/JP2022/002675
§ 371 (c)(1),
(2) Date: Nov. 16, 2023

(87) PCT Pub. No.: WO2022/244309
PCT Pub. Date: Nov. 24, 2022

(65) Prior Publication Data

US 2024/0240933 A1 Jul. 18, 2024

(30) Foreign Application Priority Data

May 21, 2021 (JP) ................................ 2021-086172

(51) Int. Cl.
*G01B 11/06* (2006.01)

(52) U.S. Cl.
CPC ................................ *G01B 11/0625* (2013.01)

(58) Field of Classification Search
CPC ............ G01B 11/0683; G01B 11/0625; G01B 11/0633; G01B 11/0675; H01L 21/67253; H01L 22/12; G01N 21/255
See application file for complete search history.

(56) References Cited

U.S. PATENT DOCUMENTS 6,137,575 A * 10/2000 Sugiyama .......... G01B 11/0625 356/493
2004/0075836 A1 4/2004 Horie et al.
2018/0172431 A1 6/2018 Okamoto et al.

FOREIGN PATENT DOCUMENTS

CN 1782662 A 6/2006
CN 101981406 A 2/2011
(Continued)

OTHER PUBLICATIONS

Machine translation of Okawachi (Year: 2009).*
(Continued)

*Primary Examiner* — Tarifur R Chowdhury
*Assistant Examiner* — Paul Schnase
(74) *Attorney, Agent, or Firm* — Faegre Drinker Biddle & Reath LLP

(57) ABSTRACT

A film thickness measurement apparatus includes a light source that irradiates a sample with light, an area sensor that detects light from the sample and outputs a signal according to luminance information of the detected light, a spectrometer that spectrally detects light from the sample and outputs a signal according to wavelength information including a spectrum of the light, and a control apparatus that estimates a film thickness of the sample on the basis of the luminance information specified from the signal output from the area sensor and the wavelength information specified from the signal output from the spectrometer.

15 Claims, 4 Drawing Sheets

(56) References Cited

FOREIGN PATENT DOCUMENTS

| | | | | | |
|---|---|---|---|---|---|
| CN | 102914268 | A | | 2/2013 | |
| CN | 103140750 | A | | 6/2013 | |
| GB | 2312952 | A | * | 11/1997 | ......... G01B 11/0683 |
| JP | 11-132726 | A | | 5/1999 | |
| JP | 2001-356050 | A | | 12/2001 | |
| JP | 2002-081910 | A | | 3/2002 | |
| JP | 2006-153770 | A | | 6/2006 | |
| JP | 2009092454 | A | * | 4/2009 | |
| JP | 2010-117161 | A | | 5/2010 | |
| JP | 2013-145229 | A | | 7/2013 | |
| JP | 2014-085112 | A | | 5/2014 | |
| JP | 2017-044596 | A | | 3/2017 | |
| JP | 2019-144118 | A | | 8/2019 | |

OTHER PUBLICATIONS

Extended European Search Report issued on Apr. 29, 2025 in corresponding European patent application 22804232.1.

International Preliminary Report on Patentability mailed Nov. 30, 2023 for PCT/JP2022/002675.

Katsuichi Kitagawa and Masafumi Otsuki, “Wide-view Transparent Film Thickness Measurement System by Interference Color Analysis,” Journal of the Japan Society for Precision Engineering, vol. 79, No. 11 (2013), pp. 1078-1082.

* cited by examiner

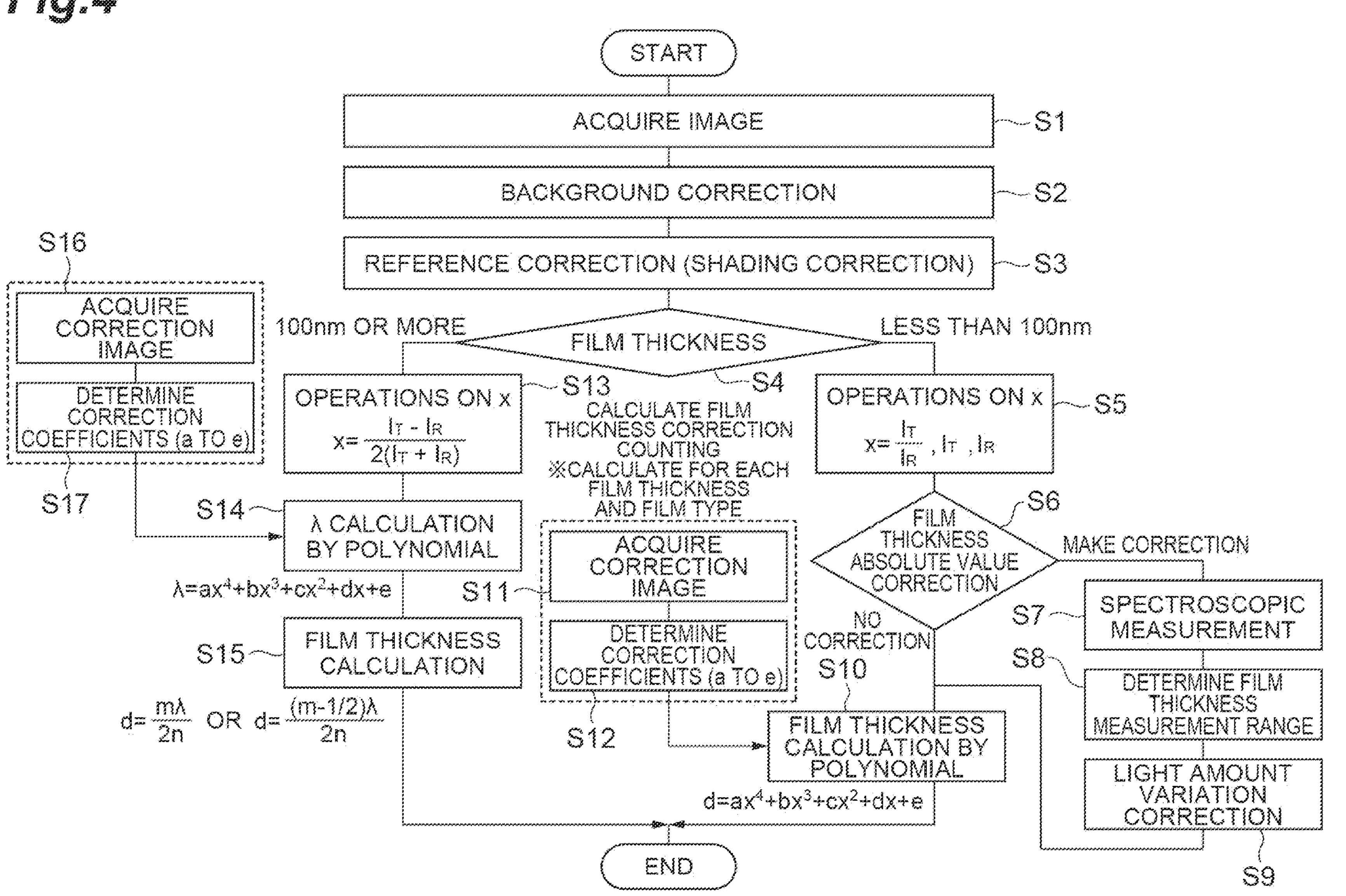

Fig.4
START
ACQUIRE IMAGE
S1
BACKGROUND CORRECTION
S2
REFERENCE CORRECTION (SHADING CORRECTION)
S3
100nm OR MORE
FILM THICKNESS
LESS THAN 100nm
S4
OPERATIONS ON x
x= (IT - IR)/2(IT + IR)
S13
CALCULATE FILM THICKNESS CORRECTION COUNTING
※CALCULATE FOR EACH FILM THICKNESS AND FILM TYPE
OPERATIONS ON x
x= IT/IR , IT , IR
S5
S16
ACQUIRE CORRECTION IMAGE
DETERMINE CORRECTION COEFFICIENTS (a TO e)
S17
S14
λ CALCULATION BY POLYNOMIAL
λ=ax4+bx3+cx2+dx+e
S11
ACQUIRE CORRECTION IMAGE
DETERMINE CORRECTION COEFFICIENTS (a TO e)
S12
FILM THICKNESS ABSOLUTE VALUE CORRECTION
S6
MAKE CORRECTION
NO CORRECTION
S7
SPECTROSCOPIC MEASUREMENT
S8
DETERMINE FILM THICKNESS MEASUREMENT RANGE
LIGHT AMOUNT VARIATION CORRECTION
S9
S15
FILM THICKNESS CALCULATION
d= mλ/2n OR d= (m-1/2)λ/2n
S10
FILM THICKNESS CALCULATION BY POLYNOMIAL
d=ax4+bx3+cx2+dx+e
END

FILM THICKNESS MEASUREMENT DEVICE AND FILM THICKNESS MEASUREMENT METHOD

TECHNICAL FIELD

One aspect of the present invention relates to a film thickness measurement apparatus and a film thickness measurement method.

BACKGROUND ART

As a technique for measuring a film thickness of an object to be measured, there is known a technique in which white light is emitted to the object to be measured and reflected light thereof is detected by a color camera to acquire an interference color image of three wavelengths, and film thickness distribution measurement is performed in units of areas based on a predetermined algorithm (See, for example, Patent Literatures 1 and 2, and Non Patent Literature 1.).

CITATION LIST

Patent Literature

Patent Literature 1: Japanese Unexamined Patent Publication No. 2013-145229

Patent Literature 2: Japanese Unexamined Patent Publication No. 2014-085112

Non Patent Literature

Non Patent Literature 1: Katsuichi Kitagawa, Masafumi Ohtsuki, "Development of wide-field film thickness distribution measuring apparatus for transparent film by interference color image analysis", Journal of the Japan Society of Fine Engineers 79 (11), 1078-1082, 2013.

SUMMARY OF INVENTION

Technical Problem

In the present technical field, it is required to measure a film thickness of an object to be measured with higher accuracy.

An aspect of the present invention has been made in view of the above circumstances, and an object thereof is to derive a film thickness of an object to be measured with high accuracy.

Solution to Problem

A film thickness measurement apparatus according to an aspect of the present invention includes: a light irradiation unit configured to irradiate an object to be measured with light; a light detection unit including a first light detector being an area sensor or a line sensor detecting light from the object to be measured, and configured to output a signal according to luminance information of the detected light; a spectrometer configured to spectrally detect light from the object to be measured and output a signal according to wavelength information including a spectrum of the light; and an analysis unit configured to estimate a film thickness of the object to be measured based on the luminance information specified from the signal output from the light detection unit and the wavelength information specified from the signal output from the spectrometer.

In a film thickness measurement apparatus according to an aspect of the present invention, light from the object to be measured is detected by the light detection unit and spectrally detected by the spectrometer, and a film thickness of the object to be measured is estimated on the basis of the luminance information specified from the signal output from the light detection unit and the wavelength information specified from the signal output from the spectrometer. The luminance information (reflectance of light) of light detected by the light detection unit is a value according to the film thickness of the object to be measured. Here, only a relative distribution of the film thickness is specified only by the luminance information, and an absolute value is not specified. In this regard, in the film thickness measurement apparatus according to one aspect of the present invention, since the wavelength information including the spectrum of the spectrally detected light is further considered, the absolute value of the film thickness at a spectrally detected point can be specified. As a result, the absolute value of the film thickness of each area of the object to be measured can be appropriately derived based on the relative film thickness distribution specified from the luminance information and the absolute value of the film thickness of the spectrally detected point. As described above, the film thickness of the object to be measured can be derived with high accuracy by calibrating a detection result in the light detection unit with a detection result in the spectrometer.

The film thickness measurement apparatus may further include a light dividing element configured to divide light from the object to be measured, the light detection unit may further include a second light detector being an area sensor or a line sensor, and the light dividing element may divide light from the object to be measured and guide the light to the first light detector and the second light detector. As described above, the light from the object to be measured is divided, and the divided light is detected by the two light detectors, whereby the light can be divided for each wavelength band, for example, and the film thickness can be estimated from the luminance information in the desired wavelength band. As a result, the film thickness of the object to be measured can be derived with higher accuracy.

The light dividing element may include an inclined dichroic mirror configured to change in transmittance and reflectance according to a wavelength in a predetermined wavelength region and divide light from the object to be measured by transmitting and reflecting the light. According to such a configuration, the light can be appropriately divided for each wavelength band.

The light dividing element may include a dichroic mirror or a half mirror, and a band pass filter. According to such a configuration, the light can be appropriately divided for each wavelength band.

The light detection unit may output a signal according to the luminance information including a ratio between a luminance value of light detected by the first light detector and a luminance value of light detected by the second light detector. It is conceivable that light detected by the light detector is affected by, for example, fluctuation of a light source, background light, or the like. In this case, there is a possibility that the film thickness cannot be estimated with high accuracy based on the luminance information. In this regard, by deriving the ratio of the luminance values of the light of the two wavelength bands divided according to the wavelength, luminance information that is not affected by the above-described background light or the like can be derived. By estimating the film thickness on the basis of such luminance information, highly accurate film thickness estimation can be realized.

The analysis unit may determine whether or not to perform film thickness estimation of the object to be measured using the luminance information and the wavelength information based on information of the object to be measured. The method by which the film thickness can be estimated with high accuracy varies depending on the state (for example, thickness) of the object to be measured, but the film thickness estimation suitable for the state of the object to be measured can be performed by determining whether or not to perform the above-described "film thickness estimation using the luminance information and the wavelength information" based on the information of the object to be measured. Accordingly, highly accurate film thickness estimation can be realized.

The light dividing element may include an inclined dichroic mirror configured to change in transmittance and reflectance according to a wavelength in a predetermined wavelength region and divide light from the object to be measured by transmitting and reflecting the light, and the analysis unit may estimate a film thickness of the object to be measured based on the luminance information and the wavelength information in a case where a thickness of the film thickness of the object to be measured is smaller than a predetermined value, and may specify a wavelength center of gravity based on a signal output from the light detection unit, and estimate a film thickness of the object to be measured based on the wavelength center of gravity in a case where the thickness of the film thickness of the object to be measured is larger than the predetermined value. According to the method of estimating the film thickness of the object to be measured based on the wavelength center of gravity, it is possible to more easily realize highly accurate film thickness estimation. However, in a case where the film thickness is small, it is difficult to estimate the film thickness with high accuracy based on the wavelength center of gravity. In this regard, a thickness of the film thickness of the object to be measured is acquired, and in a case where the thickness of the film thickness is smaller than a predetermined value, the film thickness estimation based on the above-described luminance information and wavelength information is performed, so that the film thickness estimation can be performed with high accuracy even in a case where the film thickness is small. Then, in a case where the thickness of the film thickness is sufficiently large, the film thickness estimation based on the wavelength center of gravity is performed, so that the film thickness estimation can be quickly performed with high accuracy by a simpler method.

The analysis unit may specify a film thickness measurement range that is a range of a film thickness that can be measured based on the wavelength information, and estimate, as a film thickness of the object to be measured, a film thickness included in the film thickness measurement range among one or a plurality of film thicknesses specified based on a relational expression between luminance and a film thickness and the luminance information. Since the relational expression holds for the luminance of the light from the object to be measured and the film thickness, the relational expression between the luminance and the film thickness can be defined in advance. Here, since the relationship between the luminance and the film thickness is indicated by a waveform indicating a periodic change, even if the luminance is specified on the basis of the luminance information, there are a plurality of film thickness candidates corresponding to the luminance. In this regard, since the range of the film thickness that can be measured (film thickness measurement range) is specified by using the wavelength information including the spectrum, one film thickness can be specified from among the plurality of film thickness candidates. The film thickness specified in this manner is estimated as the film thickness of the object, whereby highly accurate film thickness estimation can be realized.

The analysis unit may estimate a film thickness of the object to be measured based on corrected luminance information obtained by correcting a luminance value indicated by the luminance information by a change amount from an initial value of a spectrum of the wavelength information. It is conceivable that light detected by the light detector is affected by, for example, fluctuation of a light source, background light, or the like. In this case, there is a possibility that the film thickness cannot be estimated with high accuracy based on the luminance information. In this regard, the luminance value indicated by the luminance information is corrected by the change amount from the initial value of the spectrum, whereby the film thickness can be estimated with high accuracy by the luminance information in which the influence of the fluctuation of the light source, the background light, and the like originally included is canceled.

A film thickness measurement method according to an aspect of the present invention includes: a light irradiation step of irradiating an object to be measured with light; a light detection step of detecting light from the object to be measured and outputting a signal according to luminance information of the detected light; a spectroscopic step of spectrally detecting light from the object to be measured and outputting a signal according to wavelength information including a spectrum of the light; and a film thickness estimation step of estimating a film thickness of the object to be measured based on the luminance information specified from the signal output in the light detection step and the wavelength information specified from the signal output in the spectroscopic step.

In the light detection step, the light from the object to be measured may be divided, and the luminance information may be acquired by detecting each of the divided light.

In the light detection step, a signal according to the luminance information including a ratio of luminance values of the respective divided light may be output.

In the film thickness estimation step, whether or not to perform film thickness estimation of the object to be measured using the luminance information and the wavelength information may be determined based on information of the object to be measured.

In the light detection step, the light from the object to be measured may be divided by an inclined dichroic mirror configured to change in transmittance and reflectance according to a wavelength in a predetermined wavelength region and divide the light from the object to be measured by transmitting and reflecting the light, and in the film thickness estimation step, in a case where a thickness of the film thickness of the object to be measured is smaller than a predetermined value, the film thickness of the object to be measured may be estimated based on the luminance information and the wavelength information, and in a case where the thickness of the film thickness of the object to be measured is larger than the predetermined value, a wavelength center of gravity may be specified based on a signal output in the light detection step, and the film thickness of the object to be measured may be estimated based on the wavelength center of gravity.

In the film thickness estimation step, a film thickness measurement range that is a range of a film thickness that can be measured may be specified based on the wavelength information, and a film thickness included in the film thickness measurement range among one or a plurality of film thicknesses specified based on a relational expression between luminance and a film thickness and the luminance information may be estimated as a film thickness of the object to be measured.

In the film thickness estimation step, the film thickness of the object to be measured may be estimated based on corrected luminance information obtained by correcting a luminance value indicated by the luminance information by a change amount from an initial value of a spectrum of the wavelength information.

Advantageous Effects of Invention

According to one aspect of the present invention, the film thickness of the object to be measured can be derived with high accuracy.

BRIEF DESCRIPTION OF DRAWINGS

FIG. 4 is a flowchart illustrating a film thickness measurement flow according to an embodiment of the present invention.

DESCRIPTION OF EMBODIMENTS

Figure 1:
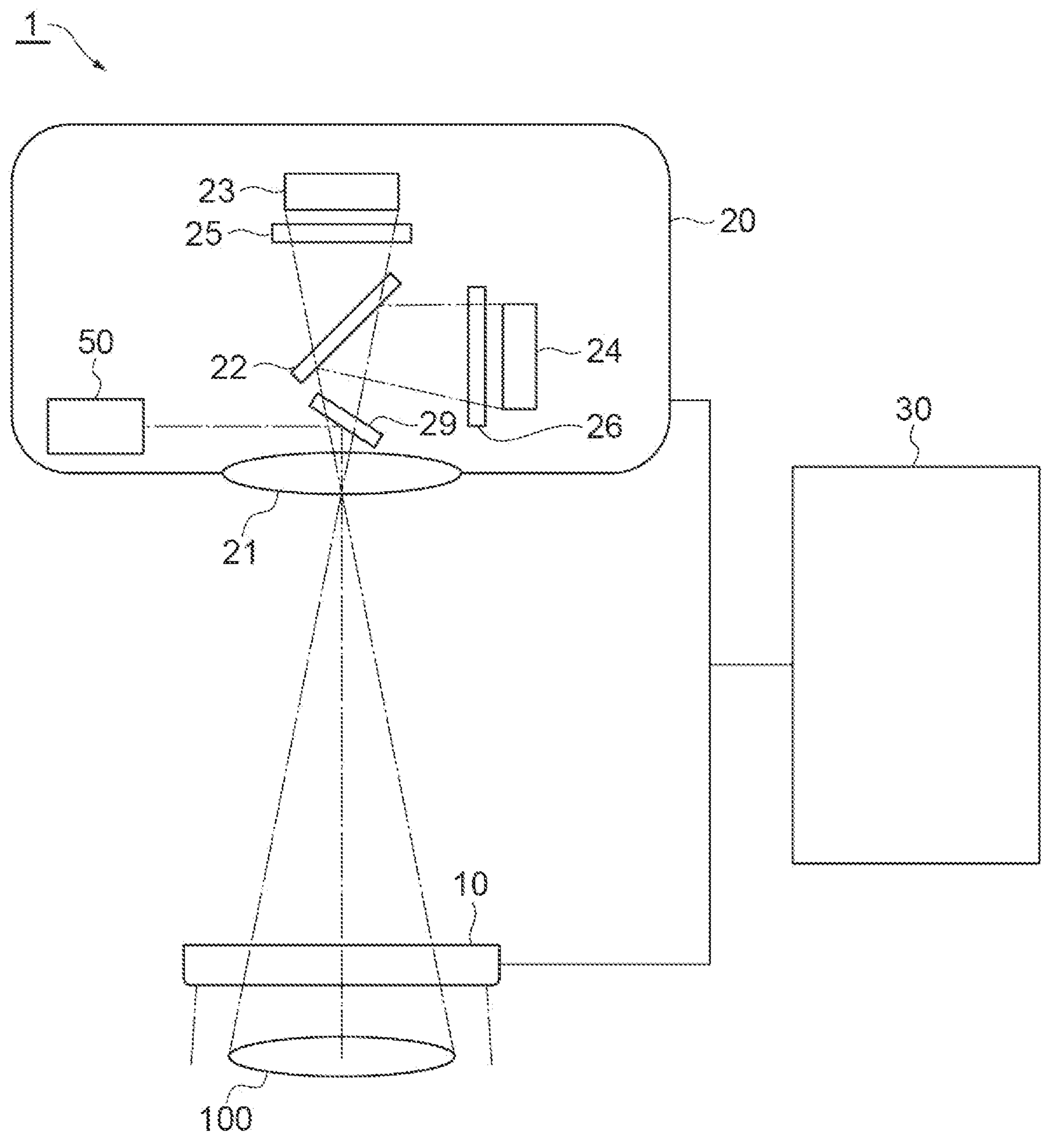
FIG. 1 is a diagram schematically illustrating a film thickness measurement apparatus according to an embodiment of the present invention.

Hereinafter, embodiments of the present invention will be described in detail with reference to the drawings. Note that, in the drawings, the same or corresponding parts are denoted by the same reference signs, and redundant description will be omitted.

FIG. 1 is a diagram schematically illustrating a film thickness measurement apparatus 1 according to the present embodiment. The film thickness measurement apparatus 1 is an apparatus that irradiates a sample 100 (object to be measured) with, for example, planar light and measures a thickness of a film formed on the sample 100 based on reflected light from the sample 100. The sample 100 may be, for example, a light emitting element such as an LED, a mini LED, a μLED, an SLD element, a laser element, a vertical laser element (VCSEL), or an OLED, or may be a light emitting element that adjusts a light emission wavelength by a fluorescent substance including a nano dot or the like. Furthermore, the sample 100 may be, for example, a semiconductor material such as a wafer on which a thin film is formed.

As illustrated in FIG. 1, the film thickness measurement apparatus 1 includes a light source 10 (light irradiation unit), a camera system 20, and a control apparatus 30 (analysis unit).

The light source 10 irradiates the sample 100 with, for example, planar light. For example, the light source 10 planarly irradiates substantially the entire surface of the sample 100 with light. The light source 10 is, for example, a light source capable of uniformly irradiating the surface of the sample 100, and irradiates the sample 100 with diffused light. The light source 10 may be a so-called flat dome light source or a dome light source. According to the flat dome light source, it is possible to suppress reflection while securing a sufficient field of view (for example, a field of view about 300 mm). The light source 10 may be a surface lighting unit using a white LED, a halogen lamp, a Xe lamp, or the like.

The light source 10 irradiates the sample 100 with light having a wavelength included in a predetermined wavelength region of an inclined dichroic mirror 22 (details will be described later) included in the camera system 20, for example. Although details will be described later, the inclined dichroic mirror 22 is an optical element that divides the light from the sample 100 by transmitting and reflecting the light according to the wavelength. The transmittance and the reflectance of the inclined dichroic mirror 22 change according to the wavelength in the predetermined wavelength range described above.

The camera system 20 includes a lens 21, an inclined dichroic mirror 22 (light dividing element), area sensors 23 and 24 (light detection units), band pass filters 25 and 26, a half mirror 29, and a spectrometer 50.

The lens 21 is a lens that condenses the incident light from the sample 100. The lens 21 may be disposed in a preceding stage (upstream) of the inclined dichroic mirror 22, or may be disposed in an area between the inclined dichroic mirror 22 and the area sensors 23 and 24. The lens 21 may be a finite focus lens or an infinite focus lens. In a case where the lens 21 is a finite focus lens, a distance from the lens 21 to the area sensors 23 and 24 is a predetermined value. In a case where the lens 21 is an infinite focus lens, the lens 21 is a collimator lens that converts light from the sample 100 into parallel light, and aberration correction is performed so as to obtain parallel light. Light output from the lens 21 is incident on the inclined dichroic mirror 22.

The inclined dichroic mirror 22 is a mirror created using a special optical material, and is a light dividing element that divides light from the sample 100 by transmitting and reflecting the light according to the wavelength. The inclined dichroic mirror 22 divides the light from the sample 100 and guides the light to the area sensors 23 and 24. The inclined dichroic mirror 22 is configured such that transmittance and reflectance of light change according to a wavelength in a predetermined wavelength region. That is, in the inclined dichroic mirror 22, the transmittance (and reflectance) of light gently changes according to a change in wavelength in a predetermined wavelength region, and the transmittance (and reflectance) of light is constant regardless of the change in wavelength in a wavelength region other than the predetermined wavelength region. In other words, in a specific wavelength band, the transmittance of light monotonically increases (reflectance monotonically decreases) according to a change in wavelength. The transmittance and the reflectance have a negative correlation such that when one is changed in a direction in which the other is increased, the other is changed in a direction in which the other is decreased. Therefore, hereinafter, the transmittance and the reflectance may be simply described as "transmittance" instead of "transmittance (and reflectance)". Note that "the transmittance of light is constant regardless of a change in wavelength" includes not only a case where the transmittance is completely constant but also a case where a change in transmittance with respect to a change in wavelength of 1 nm is 0.1% or less, for example.

The area sensors 23 and 24 capture (detect) light (in particular, the light divided by the tilted dichroic mirror 22) from the sample 100. The area sensor 23 is a first light detector that images the light transmitted through the inclined dichroic mirror 22. The area sensor 24 is a second light detector that images the light reflected by the inclined dichroic mirror 22. The range of wavelengths in which the area sensors 23 and 24 have sensitivity corresponds to a predetermined wavelength range in which transmittance (and reflectance) of light changes according to a change in wavelength in the inclined dichroic mirror 22. The area sensors 23 and 24 are, for example, monochrome sensors or color sensors. The area sensors 23 and 24 output signals according to luminance information of the detected light. More specifically, the area sensors 23 and 24 may output a signal according to luminance information including a ratio between a luminance value of light detected by the area sensor 23 and a luminance value of light detected by the area sensor 24 to the control apparatus 30. Note that the signals output from the area sensors 23 and 24 are, for example, imaging results (images).

Note that the above-described inclined dichroic mirror 22 may be replaced with another light dividing element. For example, such a light dividing element may include, for example, a normal dichroic mirror (a dichroic mirror having a small change in transmittance and reflectance according to a wavelength) or a half mirror, and a band pass filter. Furthermore, the area sensors 23 and 24 described above may be replaced with other light detectors. For example, such a light detector may be, for example, a line sensor.

The band pass filter 25 is disposed between the inclined dichroic mirror 22 and the area sensor 23. The band pass filter 26 is disposed between the inclined dichroic mirror 22 and the area sensor 24. The band pass filters 25 and 26 may be, for example, filters that remove light in a wavelength range other than the above-described predetermined wavelength range (in the inclined dichroic mirror 22, a wavelength range in which transmittance and reflectance of light change according to a wavelength).

The half mirror 29 is provided, for example, in an optical path between the lens 21 and the inclined dichroic mirror 22, and reflects light from one point of the sample 100 (for example, one point near the center of the sample 100) toward the spectrometer 50.

The spectrometer 50 spectrally detects light from the sample 100, specifically, light from one point of the sample 100 reflected by the half mirror 29, and acquires a spectrum of the light. The spectrum here is a spectroscopic spectrum indicating the intensity of light for each wavelength. According to such a spectroscopic spectrum, the control apparatus 30 can specify an absolute value of the thickness of one point of the sample 100 described above. The spectrometer 50 outputs a signal according to wavelength information including the spectroscopic spectrum to the control apparatus 30. Note that the spectrometer 50 may be provided outside the camera system 20 to spectrally detect light from the sample 100 before entering the lens 21.

The control apparatus 30 is a computer, and physically includes a memory such as a RAM and a ROM, a processor (arithmetic circuit) such as a CPU, a communication interface, and a storage unit such as a hard disk. The control apparatus 30 functions by executing a program stored in the memory by the CPU of the computer system. The control apparatus 30 may include a microcomputer or an FPGA.

The control apparatus 30 is an analysis unit that estimates the film thickness of the sample 100. The control apparatus 30 performs preprocessing, selection processing, and film thickness estimation processing. Each processing will be described below.

(Preprocessing)

The control apparatus 30 acquires captured images (signals according to luminance information) from the area sensors 23 and 24, and performs preprocessing on the captured images. The preprocessing here is correction processing for estimating the film thickness of the sample 100 with high accuracy based on the captured image, and is, for example, background correction and reference correction (shading correction).

The background correction is processing for appropriately acquiring the luminance value of the light from the sample 100 according to the emitted light by subtracting the light (background light) from the atmosphere included in the captured image. In the background correction, for example, the luminance value of the image data of the sample 100 in a non-reflection state is subtracted from the luminance value of the captured image. For the purpose of removing the influence of the direct light from the light source 10, x according to the luminance information of the captured image may be derived by the following Formula (1) using the signal amount in the non-reflection state. In the following Formula (1), IT represents the amount of transmitted light, IR represents the amount of reflected light, ITr represents the amount of transmitted light in the reference, IRr represents the amount of reflected light in the reference, ITb represents the amount of transmitted light in the non-reflection state, and IRb represents the amount of reflected light in the non-reflection state.

$$x = \{(IT - ITb)/(ITr - ITb) - (IR - IRb)/(IRr - IRb)\}/2\{(IT - ITb)/(ITr - ITb) + (IR - IRb)/(IRr - IRb)\} \tag{1}$$

The reference correction (shading correction) is processing of correcting individual differences such as brightness unevenness and aberration caused by the optical system by acquiring difference data between the captured image and the shading image in the region corresponding to the captured image. In the reference correction, for example, the captured image is divided by the image data of the reference sample. For example, x may be derived by the following Formula (2) using a signal intensity of a substrate having a known reflection characteristic as a reference.

$$x = (IT/ITr - IR/IRr)/2(IT/ITr + IR/IRr) \tag{2}$$

(Selection Processing)

The control apparatus 30 performs selection processing subsequent to the preprocessing. The control apparatus 30 selects a film thickness estimation method based on the information of the sample 100 (specifically, the film thickness of the sample 100). The film thickness of the sample 100 may be set in advance in the control apparatus 30 or may be input by a user. The control apparatus 30 selects one of a wavelength shift method and a reflected light amount thickness conversion method (details will be described later) as a film thickness estimation method. The control apparatus 30 selects the reflected light amount thickness conversion method in a case where the film thickness of the sample 100 is smaller than a predetermined value (for example, 100 nm), and selects the wavelength shift method in a case where the film thickness of the sample 100 is larger than the predetermined value.

(Film Thickness Estimation Processing)

The control apparatus 30 estimates the film thickness of the sample 100 by the film thickness estimation method selected in the selection processing. That is, the control apparatus 30 estimates the film thickness of the sample 100 by the wavelength shift method or the reflected light amount thickness conversion method.

In the wavelength shift method, the control apparatus 30 specifies a wavelength center of gravity on the basis of the signals (captured images) output from the area sensors 23 and 24, and estimates the film thickness of the sample 100 on the basis of the wavelength center of gravity. The control apparatus 30 derives the wavelength center of gravity of the light for each pixel based on the amount of transmitted light specified based on the captured image in the area sensor 23, the amount of reflected light specified based on a captured image in the area sensor 24, a center wavelength of the inclined dichroic mirror 22, and a width of the inclined dichroic mirror 22, and estimates the film thickness corresponding to each pixel based on the wavelength center of gravity. The width of the inclined dichroic mirror 22 is, for example, a wavelength width from a wavelength at which transmittance becomes 0% to a wavelength at which transmittance becomes 100% in the inclined dichroic mirror 22.

Specifically, the control apparatus 30 derives the wavelength center of gravity of each pixel on the basis of the following Formula (3). In the following Formula (3), μ represents the wavelength center of gravity, λ0 represents the center wavelength of the inclined dichroic mirror 22, W represents the width of the inclined dichroic mirror 22, R represents the amount of reflected light, and T represents the amount of transmitted light. As described above, the value of the wavelength center of gravity is shifted (wavelength shift) based on the amount of transmitted light and the amount of reflected light.

$$\lambda = \lambda 0 + W(T - R)/2(T + R) \quad (3)$$

Note that the method of deriving the wavelength center of gravity is not limited to the above. For example, since λ (wavelength center of gravity) has a proportional relationship with the following x, the wavelength center of gravity may be derived from the following Formulas (4) and (5). In the following Formula (5), IT represents the amount of transmitted light, and IR represents the amount of reflected light. Furthermore, in a case where the spectrum shape to be measured or the line formation of inclined dichroic mirror 22 is an ideal shape, parameters a and b in Formula (4) can be determined by the optical characteristics of inclined dichroic mirror 22.

$$\lambda = ax + b \quad (4)$$

$$x = IT - IR/2(IT + IR) \quad (5)$$

Furthermore, in order to comprehensively perform various corrections such as film characteristics, an irradiation spectrum, and nonlinearity of the inclined dichroic mirror 22, the wavelength center of gravity (λ) may be approximated by a polynomial equation such as the following Formula (6). Note that each parameter (a, b, c, d, and e) in the following Formula (6) is determined, for example, by measuring a plurality of samples having different wavelength centers of gravity (film thicknesses).

$$\lambda = ax^4 + bx^3 + cx^2 + dx + e \quad (6)$$

Then, since the wavelength center of gravity varies depending on the difference in film thickness, the film thickness can be estimated by specifying the wavelength center of gravity. The relationship between the wavelength and the film thickness can be described by the following Formula (7). In the following Formula (7), n represents the refractive index of the film, d represents the film thickness, m represents a positive integer (1, 2, 3, . . . ), and λ represents the wavelength center of gravity. 2nd indicates an optical path difference (an optical path difference caused by the arrangement of the film). The control apparatus 30 estimates the film thickness corresponding to each pixel from the wavelength center of gravity of each pixel on the basis of the following Formula (7).

$$2nd = m\lambda (m = 1, 2, 3, \ldots)\text{(mutally reinforcing condition)} \quad (7)$$

$$2nd = (m - 1/2)\lambda (m = 1, 2, 3, \ldots)\text{(weakening condition)}$$

Figure 2:
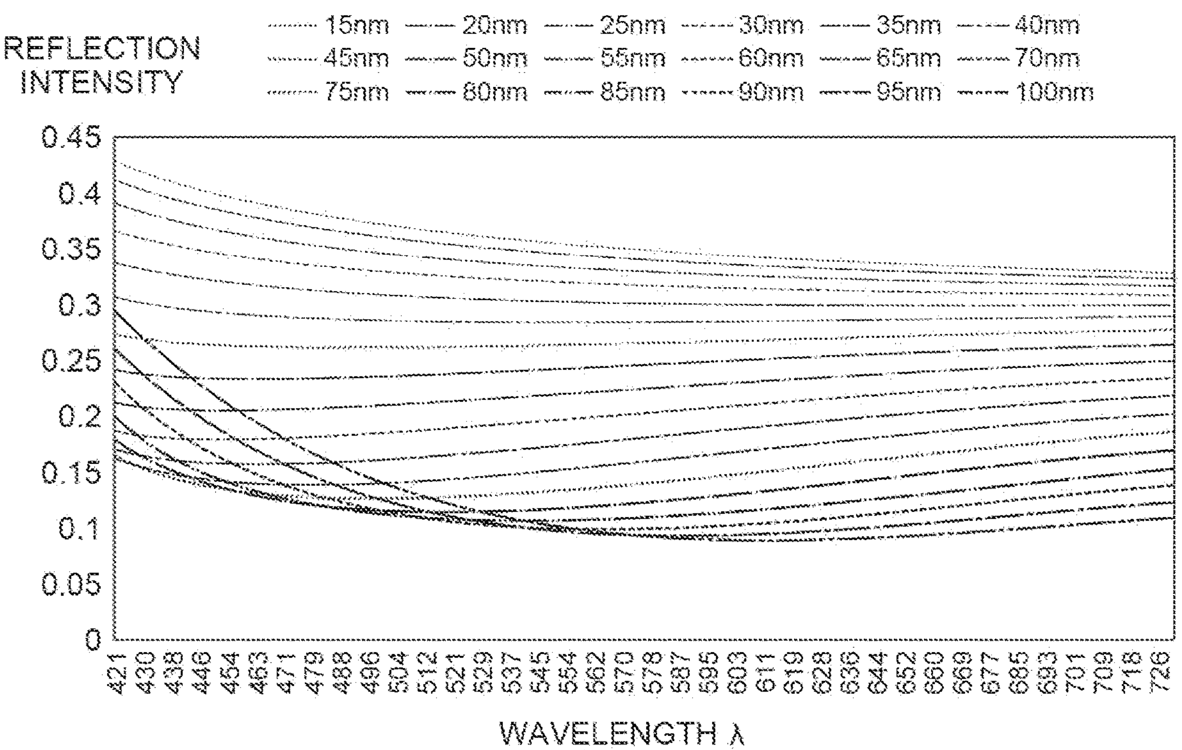
FIG. 2 is a diagram illustrating a relationship between a wavelength and reflection intensity for each film thickness.

Here, the shift (wavelength shift) of the value of the wavelength center of gravity based on the amount of transmitted light and the amount of reflected light as described above is less likely to occur in a case where the film thickness of the sample 100 is thin. FIG. 2 is a diagram illustrating a relationship between a wavelength and reflection intensity (reflectance of light detected by the area sensors 23 and 24) for each film thickness. In FIG. 2, the horizontal axis represents wavelength, and the vertical axis represents reflection intensity (reflectance). As illustrated in FIG. 2, it can be seen that as the film thickness decreases, the change in wavelength decreases even when the reflectance (light amount) changes. In a case where the wavelength is not sufficiently shifted according to the light amount, it becomes difficult to estimate the film thickness by the above-described wavelength shift method. Specifically, in the wavelength shift method described above, when the film thickness of the sample 100 is thinner than 100 nm, it becomes difficult to estimate the film thickness with high accuracy. Therefore, in a case where the film thickness of the sample 100 is smaller than a predetermined value (for example, 100 nm), the control apparatus 30 estimates the film thickness of the sample 100 by the reflected light amount thickness conversion method.

In the reflected light amount thickness conversion method, the control apparatus 30 estimates the film thickness of the sample 100 on the basis of luminance information specified from the signals (captured images) output from the area sensors 23 and 24 and wavelength information specified from the signal output from the spectrometer 50.

Specifically, the control apparatus 30 first derives a value of x according to the luminance information of the captured image. For example, in a case where luminance information of light on the transmission side in the inclined dichroic mirror 22 is used, x=IT (IT is the amount of transmitted light). Furthermore, in a case where luminance information of light on the reflection side in the inclined dichroic mirror 22 is used, x=IR (IR is the amount of reflected light). Furthermore, in a case where luminance information including a ratio between a luminance value of light detected by the area sensor 23 and a luminance value of light detected by the area sensor 24 is used, x=IT/IR may be satisfied. It is conceivable that the light detected by the area sensors 23 and 24 is affected by, for example, fluctuation of the light source 10, background light, or the like (light amount fluctuation occurs). However, the light amount fluctuation as described above can be corrected by setting the value of x according to the luminance information to a ratio value such as IT/IR. Note that such light quantity variation correction is effective in a case where the light quantity variation amount is extremely small compared to the detected light quantity.

The control apparatus 30 may perform the light amount variation correction described above by correcting the values of IT (IT is the amount of transmitted light) and IR (IR is the amount of reflected light) related to the derivation of x described above on the basis of the wavelength information specified from the signal output from the spectrometer 50. The control apparatus 30 may perform light quantity variation correction of IT and IR by the following Formula (8). In the following Formula (8), IT' is the amount of transmitted light after correction, IR' is the amount of reflected light after correction, T(λ) is the transmittance at the inclined dichroic mirror 22, R(λ) is the reflectance at the inclined dichroic mirror 22, I(λ) is the spectrum included in the wavelength information (the spectrum measured by the spectrometer 50), and Iini(λ) is the initial value of the spectrum measured by the spectrometer 50. Note that, in the inclined dichroic mirror 22, R(λ)=1−T(λ).

$$IT' = IT \times \left(\sum (Iini(\lambda)T(\lambda)) / \sum (I(\lambda)T(\lambda))\right) \quad (8)$$

$$IR' = IR \times \left(\sum (Iini(\lambda)R(\lambda)) / \sum (I(\lambda)R(\lambda))\right)$$

As indicated by the above-described Formula (8), the control apparatus 30 corrects IT (or IR) according to the luminance value indicated by the luminance information by the amount of change from the initial value of the spectrum measured by the spectrometer 50, thereby deriving IT' and IR' that are the corrected luminance information. As described above, the luminance value is corrected by the amount of change from the initial value of the spectrum, whereby the influence of the fluctuation of the light source 10, the background light, and the like, which are originally included, can be canceled. Note that, as described above, in a case where the value of x is a ratio value as in IT/IR, the light amount variation correction is performed by using the ratio value, and thus the light amount variation correction by the formula (8) does not necessarily need to be performed. However, in a case where there are light quantity fluctuations independent of each other in the transmission signal and the reflection signal, it is preferable to perform light quantity fluctuation correction by Formula (8). That is, in a case where the behavior of the light source 10 changes depending on the wavelength band, or the like, the light amount variation correction by Formula (8) is preferable. Hereinafter, an example in which light quantity variation correction is performed by Formula (8) and corrected luminance information is used will be described. That is, the control apparatus 30 estimates the film thickness of the sample 100 based on the corrected luminance information obtained by correcting the luminance value indicated by the luminance information by the amount of change from the initial value of the spectrum of the wavelength information.

The control apparatus 30 specifies a film thickness measurement range that is a range of a film thickness that can be measured on the basis of wavelength information specified from the signal output from the spectrometer 50, and estimates a film thickness included in the film thickness measurement range among one or a plurality of film thicknesses specified on the basis of the luminance and film thickness relational expression and the luminance information as the film thickness of the sample 100.

Figure 3:
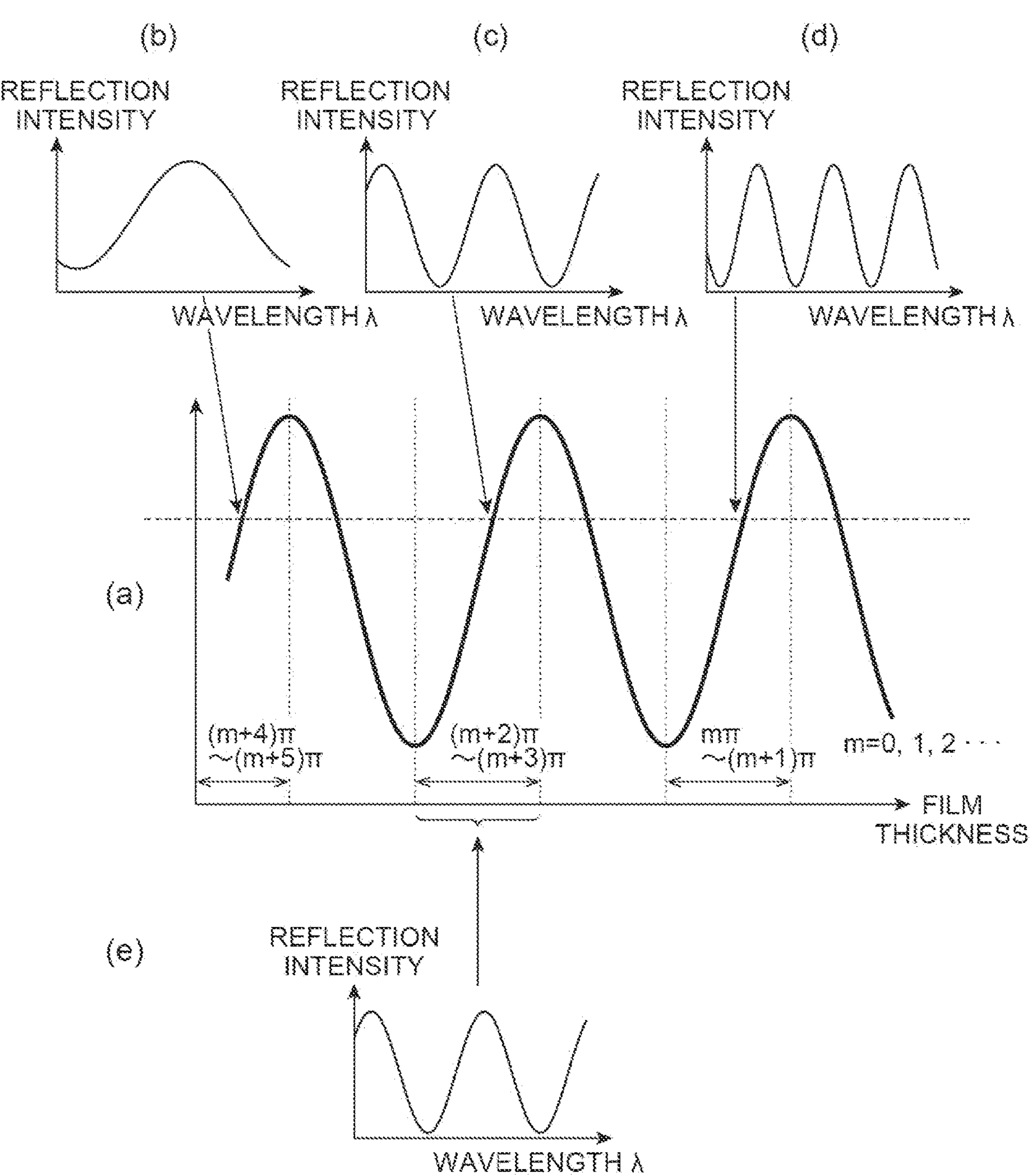
FIG. 3 is a diagram for explaining film thickness value estimation.

FIG. 3 is a diagram for explaining the film thickness value estimation described above. The relationship between the luminance value (reflection intensity) of light and the film thickness indicated by the luminance information is expressed by, for example, the following Formula (9). In the following Formula (9), I is a luminance value (reflection intensity), n is a refractive index of a film, and d is a film thickness.

$$I = A\cos(2\pi(2nd/\lambda)) + B \quad (9)$$

FIG. 3(*a*) is a diagram illustrating a relationship between a luminance value (reflection intensity) and a film thickness determined by the above Formula (9). In FIG. 3(*a*), the horizontal axis represents the film thickness, and the vertical axis represents the luminance value (reflection intensity). As is clear from Formula (9), the relationship between the luminance and the film thickness is indicated by a waveform indicating a periodic change (see FIG. 3(*a*)). Therefore, even if the luminance value is specified on the basis of the luminance information, there are a plurality of candidates for a film thickness d corresponding to the luminance value. That is, in a case where a luminance value (reflection intensity) indicated by a broken line in FIG. 3(*a*) is specified, there are a plurality of candidates for the film thickness d different for each phase. In the example illustrated in FIG. 3(*a*), there are a film thickness range of 2π(2nd/λ)=(m+4)π to (m+5)π, a film thickness range of 2π(2nd/λ)=(m+2)π to (m+3)π, and a film thickness range of 2π(2nd/λ)=mπ to (m+1)π, where m is an integer. In this case, the control apparatus 30 can specify which film thickness range is a measurable film thickness range (film thickness measurement range) on the basis of the wavelength information (see FIG. 3(*e*)) specified from the signal output from the spectrometer 50. That is, in a case where there are a relational expression between the reflection intensity and the wavelength of (m+4)π to (m+5)π (see FIG. 3(*b*)), a relational expression between the reflection intensity and the wavelength of (m+2)π to (m+3)π (see FIG. 3(*c*)), and a relational expression between the reflection intensity and the wavelength of mx to (m+1)π (see FIG. 3(*d*)), the control apparatus 30 specifies the range of the film thickness of (m+2)π to (m+3)π as the film thickness measurement range since the relational expression between the reflection intensity and the wavelength of (m+2)π to (m+3)π (see FIG. 3(*c*)) matches the wavelength information (see FIG. 3(*e*)).

In order to comprehensively perform various corrections such as film characteristics, an irradiation spectrum, and nonlinearity of the inclined dichroic mirror 22, the control apparatus 30 may approximate the film thickness d by a polynomial equation such as the following Formula (10). Note that each parameter (a, b, c, d, and e) in the following formula (10) may be set in advance for each film thickness and film type by, for example, measuring a plurality of samples having different film thicknesses and film types.

$$d = ax4 + bx3 + cx2 + dx + e \tag{10}$$

Next, a film thickness measurement flow according to the present embodiment will be described. FIG. 4 is a flowchart illustrating a film thickness measurement flow according to the present embodiment.

In the film thickness measurement apparatus 1, first, the light source 10 irradiates the sample 100 with light (light irradiation step), the area sensors 23 and 24 detect light from the sample 100, and a signal according to luminance information of the detected light is output to acquire a captured image (step S1, light detection step).

The control apparatus 30 performs background correction on the acquired image (step S2), and further performs reference correction (step S3). Then, in the control apparatus 30, a film thickness estimation method is selected on the basis of the information of the sample 100 (step S4). The control apparatus 30 determines whether or not to perform the film thickness estimation of the sample 100 using the luminance information and the wavelength information based on the film thickness of the sample 100. In a case where the film thickness is, for example, less than 100 nm, the control apparatus 30 determines to perform the film thickness estimation (reflection light amount thickness conversion method) of the sample 100 using the luminance information and the wavelength information, and performs the processing of steps S5 to S10. In a case where the film thickness is, for example, 100 nm or more, the control apparatus 30 determines to perform the wavelength shift method without performing the film thickness estimation (reflection light amount thickness conversion method) of the sample 100 using the luminance information and the wavelength information, and performs the processing of steps S13 to S15.

In the reflected light amount thickness conversion method, first, a value of x according to luminance information of a captured image is derived (step S5). For example, in a case where luminance information including a ratio between a luminance value of light detected by the area sensor 23 and a luminance value of light detected by the area sensor 24 is used, x=IT/IR.

Subsequently, it is determined whether or not film thickness absolute value correction is performed (step S6). The film thickness absolute value correction is processing of calculating the value of the film thickness using the measurement result of the absolute value of the film thickness by the spectrometer 50. In a case where the film thickness absolute value correction is not performed, the process of step S6 is followed by the process of step S10 described later.

In a case where the film thickness absolute value correction is performed, the light from the sample 100 is spectrally detected by the spectrometer 50, and a signal according to wavelength information including a spectrum of the light is output (step S7, spectroscopic step). Then, the control apparatus 30 specifies a film thickness measurement range that is a range of a film thickness that can be measured based on the wavelength information (step S8).

Furthermore, the light amount variation correction is performed by the control apparatus 30 (step S9). Specifically, the control apparatus 30 corrects the values of IT (IT is an amount of transmitted light) and IR (IR is an amount of reflected light) on the basis of the wavelength information by Formula (8) described above, thereby correcting the light amount variation.

Finally, the control apparatus 30 estimates the film thickness d by the polynomial expressed by the above-described Formula (10) (step S10, film thickness estimation step). Note that the parameters (correction coefficients) a, b, c, d, and e in Formula (10) may be set for each film thickness and film type. In that case, a correction image is acquired in advance for each film thickness and film type (step S11), and correction coefficients a to e are determined (step S12).

On the other hand, in the wavelength shift system, first, the control apparatus 30 derives x for deriving the wavelength center of gravity by the above Formula (5) (step S13). Then, the control apparatus 30 derives the wavelength center of gravity λ by the polynomial expressed by the above-described Formula (6) (step S14). Then, the control apparatus 30 estimates the film thickness from the wavelength center of gravity by the above-described Formula (7) (step S15). Note that a, b, c, d, and e, which are parameters (correction coefficients) in Formula (6), may be determined (step S17) by acquiring correction images in advance (step S16).

Next, functions and effects of the present embodiment will be described.

The film thickness measurement apparatus 1 includes the light source 10 that irradiates the sample 100 with light, the area sensor 23 that detects light from the sample 100 and outputs a signal according to luminance information of the detected light, the spectrometer 50 that spectrally detects light from the sample 100 and outputs a signal according to wavelength information including a spectrum of the light, and the control apparatus 30 that estimates the film thickness of the sample 100 on the basis of luminance information specified from the signal output from the area sensor 23 and wavelength information specified from the signal output from the spectrometer 50.

In the film thickness measurement apparatus 1 according to the present embodiment, light from the sample 100 is detected by the area sensor 23 and spectrally detected by the spectrometer 50, and the film thickness of the sample 100 is estimated on the basis of luminance information specified from a signal output from the area sensor 23 and wavelength information specified from a signal output from the spectrometer 50. The luminance information (light reflectance) of light detected by the area sensor 23 has a value according to the film thickness of the sample 100. Here, only a relative distribution of the film thickness is specified only by the luminance information, and an absolute value is not specified. In this regard, in the film thickness measurement apparatus 1 according to the present embodiment, since the wavelength information including the spectrum of the spectrally detected light is further considered, it is possible to specify an absolute value of the film thickness at the spectrally detected point. As a result, the absolute value of the film thickness of each area of the object to be measured can be appropriately derived based on the relative film thickness distribution specified from the luminance information and the absolute value of the film thickness of the spectrally detected point. As described above, the film thickness of the sample 100 can be derived with high accuracy by calibrating a detection result in the area sensor 23 by a detection result in the spectrometer 50.

The film thickness measurement apparatus 1 may further include the inclined dichroic mirror 22 (alternatively, a dichroic mirror or a half mirror and a band pass filter) which is a light dividing element that divides the light from the sample 100, and may further include the area sensor 24, and the inclined dichroic mirror 22 may divide the light from the sample 100 and guide the light to the area sensor 23 and the area sensor 24. In this manner, the light from the sample 100 is divided, and the divided light is detected by the two area sensors 23 and 24, whereby the light can be divided for each wavelength band, for example, and the film thickness can be estimated from the luminance information in a desired wavelength band. As a result, the film thickness of the sample 100 can be derived with higher accuracy.

Then, by using the inclined dichroic mirror 22 (alternatively, a dichroic mirror or a half mirror and a band pass filter) as the light dividing element, the light can be appropriately divided for each wavelength band.

The area sensors 23 and 24 may output a signal according to luminance information including a ratio between a luminance value of light detected by the area sensor 23 and a luminance value of light detected by the area sensor 24. It is conceivable that light detected by the area sensors 23 and 24 is affected by, for example, fluctuation of a light source, background light, or the like. In this case, there is a possibility that the film thickness cannot be estimated with high accuracy based on the luminance information. In this regard, by deriving the ratio of the luminance values of the light of the two wavelength bands divided according to the wavelength, luminance information that is not affected by the above-described background light or the like can be derived. By estimating the film thickness on the basis of such luminance information, highly accurate film thickness estimation can be realized.

The control apparatus 30 may determine whether or not to perform the film thickness estimation of the sample 100 using the luminance information and the wavelength information on the basis of information of the sample 100. Although the method by which the film thickness can be estimated with high accuracy differs depending on the state (for example, thickness) of the sample 100, the film thickness estimation suitable for the state of the sample 100 can be performed by determining whether or not to perform the "film thickness estimation using the luminance information and the wavelength information" described above on the basis of the information of the sample 100. Accordingly, highly accurate film thickness estimation can be realized.

In a case where the film thickness of the sample 100 is smaller than a predetermined value, the control apparatus 30 may estimate the film thickness of the sample 100 based on the luminance information and the wavelength information, and in a case where the film thickness of the sample 100 is larger than the predetermined value, the control apparatus may specify a wavelength center of gravity based on the signals output from the area sensors 23 and 24 and estimate the film thickness of the sample 100 based on the wavelength center of gravity. According to the method of estimating the film thickness of the sample 100 based on the wavelength center of gravity, it is possible to more easily realize highly accurate film thickness estimation. However, as described above, in a case where the film thickness is small, it is difficult to perform the film thickness estimation with high accuracy based on the wavelength center of gravity. In this regard, the thickness of the film thickness of the sample 100 is acquired, and in a case where the thickness of the film thickness is smaller than a predetermined value, the film thickness estimation based on the above-described luminance information and wavelength information is performed, so that the film thickness estimation can be performed with high accuracy even in a case where the film thickness is small. Then, in a case where the thickness of the film thickness is sufficiently large, the film thickness estimation based on the wavelength center of gravity is performed, so that the film thickness estimation can be quickly performed with high accuracy by a simpler method.

The control apparatus 30 may specify the film thickness measurement range that is a range of the film thickness that can be measured based on the wavelength information, and estimate the film thickness included in the film thickness measurement range among one or a plurality of film thicknesses specified based on a relational expression between luminance and a film thickness and the luminance information as a film thickness of the sample 100. Since the relational expression holds for the luminance and the film thickness of the light from the sample 100, the relational expression between the luminance and the film thickness can be defined in advance. Here, since the relationship between the luminance and the film thickness is indicated by a waveform indicating a periodic change, even if the luminance is specified on the basis of the luminance information, there are a plurality of film thickness candidates corresponding to the luminance. In this regard, since the range of the film thickness that can be measured (film thickness measurement range) is specified by using the wavelength information including the spectrum, one film thickness can be specified from among the plurality of film thickness candidates. The film thickness specified in this manner is estimated as the film thickness of the sample 100, whereby highly accurate film thickness estimation can be realized.

The control apparatus 30 may estimate the film thickness of the sample 100 based on corrected luminance information obtained by correcting the luminance value indicated by the luminance information by a change amount from the initial value of the spectrum of the wavelength information. It is conceivable that light detected by the light detector is affected by, for example, fluctuation of a light source, background light, or the like. In this case, there is a possibility that the film thickness cannot be estimated with high accuracy based on the luminance information. In this regard, the luminance value indicated by the luminance information is corrected by the change amount from the initial value of the spectrum, whereby the film thickness can be estimated with high accuracy by the luminance information in which the influence of the fluctuation of the light source, the background light, and the like originally included is canceled.

REFERENCE SIGNS LIST

1 Film thickness measurement apparatus
10 Light source (light irradiation unit)
22 Inclined dichroic mirror
23, 24 Area sensor (light detector, light detection unit)
30 Control apparatus (analysis unit)
50 Spectrometer
100 Sample (object to be measured)

The invention claimed is:

1. A film thickness measurement apparatus comprising:

a light source configured to irradiate an object to be measured with light;

a light detector including i) a first light detector being a first area sensor or a first line sensor detecting light from the object to be measured and ii) a second light detector being a second area sensor or a second line sensor, and configured to output a signal according to luminance information of the detected light, wherein the luminance information includes a ratio between a luminance value of light detected by the first light detector and a luminance value of light detected by the second light detector;

a spectrometer configured to spectrally detect light from the object to be measured and output a signal according to wavelength information including a spectrum of the light, the wavelength information includes information indicating an intensity of the light for each wavelength of a plurality of wavelengths; and a controller configured to estimate a film thickness of the object to be measured based on both i) the luminance information specified from the signal output from the light detector and ii) the wavelength information specified from the signal output from the spectrometer, wherein estimating the film thickness of the object includes i) obtaining a relative distribution of a film thickness based on the luminance information, ii) obtaining an absolute value of the film thickness at a specific point of the spectrum of the light, and iii) deriving an absolute value of the film thickness of an entire area of the object to be measured based on the obtained relative film thickness distribution and the obtained absolute value of the film thickness.

2. The film thickness measurement apparatus according to claim 1, further comprising a light dividing element configured to divide light from the object to be measured, and the light dividing element divides light from the object to be measured and guides the light to the first light detector and the second light detector.

3. The film thickness measurement apparatus according to claim 2, wherein the light dividing element includes an inclined dichroic mirror configured to change in transmittance and reflectance according to a wavelength in a predetermined wavelength region and divide light from the object to be measured by transmitting and reflecting the light.

4. The film thickness measurement apparatus according to claim 2, wherein the light dividing element includes a dichroic mirror or a half mirror, and a band pass filter.

5. The film thickness measurement apparatus according to claim 2, wherein the controller determines whether or not to perform film thickness estimation of the object to be measured using the luminance information and the wavelength information based on information of the object to be measured.

6. The film thickness measurement apparatus according to claim 5, wherein the light dividing element includes an inclined dichroic mirror configured to change in transmittance and reflectance according to a wavelength in a predetermined wavelength region and divide light from the object to be measured by transmitting and reflecting the light, and the controller estimates a film thickness of the object to be measured based on the luminance information and the wavelength information in a case where a thickness of the film thickness of the object to be measured is smaller than a predetermined value, and specifies a wavelength center of gravity based on a signal output from the light detector, and estimates a film thickness of the object to be measured based on the wavelength center of gravity in a case where the thickness of the film thickness of the object to be measured is larger than the predetermined value.

7. The film thickness measurement apparatus according to claim 2, wherein the controller specifies a film thickness measurement range that is a range of a film thickness that can be measured based on the wavelength information, and estimates, as a film thickness of the object to be measured, a film thickness included in the film thickness measurement range among one or a plurality of film thicknesses specified based on a relational expression between luminance and a film thickness and the luminance information.

8. The film thickness measurement apparatus according to claim 2, wherein the controller estimates a film thickness of the object to be measured based on corrected luminance information obtained by correcting a luminance value indicated by the luminance information by a change amount from an initial value of a spectrum of the wavelength information.

9. A film thickness measurement method comprising:

irradiating an object to be measured with light;

detecting, with a light detector, light from the object to be measured and outputting a signal according to luminance information of the detected light, wherein the light detector includes i) a first light detector being a first area sensor or a first line sensor detecting light from the object to be measured and ii) a second light detector being a second area sensor or a second line sensor, and the luminance information includes a ratio between a luminance value of light detected by the first light detector and a luminance value of light detected by the second light detector;

spectrally detecting, with a spectrometer, light from the object to be measured and outputting a signal according to wavelength information including a spectrum of the light, the wavelength information includes information indicating an intensity of the light for each wavelength of a plurality of wavelengths; and estimating a film thickness of the object to be measured based on both i) the luminance information specified from the signal output in detecting light from the object to be measured and outputting the signal according to luminance information of the detected light and ii) the wavelength information specified from the signal output in spectrally detecting light from the object to be measured and outputting the signal according to wavelength information including a spectrum of the light, wherein estimating the film thickness of the object includes i) obtaining a relative distribution of a film thickness based on the luminance information, ii) obtaining an absolute value of the film thickness at a specific point of the spectrum of the light, and iii) deriving an absolute value of the film thickness of an entire area of the object to be measured based on the obtained relative film thickness distribution and the obtained absolute value of the film thickness.

10. The film thickness measurement method according to claim 9, wherein in detecting light, the light from the object to be measured is divided, and the luminance information is acquired by detecting each of the divided light.

11. The film thickness measurement method according to claim 10, wherein in detecting light, a signal according to the luminance information including a ratio of luminance values of the respective divided light is output.

12. The film thickness measurement method according to claim 9, wherein in estimating the film thickness, a film thickness measurement range that is a range of a film thickness that can be measured is specified based on the wavelength information, and a film thickness included in the film thickness measurement range among one or a plurality of film thicknesses specified based on a relational expression between luminance and a film thickness and the luminance information is estimated as a film thickness of the object to be measured.

13. The film thickness measurement method according to claim 9, wherein in estimating the film thickness, the film thickness of the object to be measured is estimated based on corrected luminance information obtained by correcting a luminance value indicated by the luminance information by a change amount from an initial value of a spectrum of the wavelength information.

14. A film thickness measurement method comprising:

irradiating an object to be measured with light;

detecting light from the object to be measured and outputting a signal according to luminance information of the detected light, wherein in detecting light, the light from the object to be measured is divided, and the luminance information is acquired by detecting each of the divided light;

spectrally detecting light from the object to be measured and outputting a signal according to wavelength information including a spectrum of the light;

determining whether or not to perform film thickness estimation of the object to be measured using the luminance information and the wavelength information based on information of the object to be measured; and estimating, when it is determined to perform film thickness estimation of the object to be measured using the luminance information and the wavelength information, a film thickness of the object to be measured based on the luminance information specified from the signal output in detecting light from the object to be measured and outputting the signal according to luminance information of the detected light and the wavelength information specified from the signal output in spectrally detecting light from the object to be measured and outputting the signal according to wavelength information including a spectrum of the light, wherein estimating the film thickness of the object includes i) obtaining a relative distribution of a film thickness based on the luminance information, ii) obtaining an absolute value of the film thickness at a specific point of the spectrum of the light, and iii) deriving an absolute value of the film thickness of an entire area of the object to be measured based on the obtained relative film thickness distribution and the obtained absolute value of the film thickness.

15. The film thickness measurement method according to claim 14, wherein in detecting light, the light from the object to be measured is divided by an inclined dichroic mirror configured to change in transmittance and reflectance according to a wavelength in a predetermined wavelength region and divide the light from the object to be measured by transmitting and reflecting the light, and in estimating the film thickness, in a case where a thickness of the film thickness of the object to be measured is smaller than a predetermined value, the film thickness of the object to be measured is estimated based on the luminance information and the wavelength information, and in a case where the thickness of the film thickness of the object to be measured is larger than the predetermined value, a wavelength center of gravity is specified based on a signal output in detecting light, and the film thickness of the object to be measured is estimated based on the wavelength center of gravity.

* * * * *